UNITED STATES PATENT OFFICE.

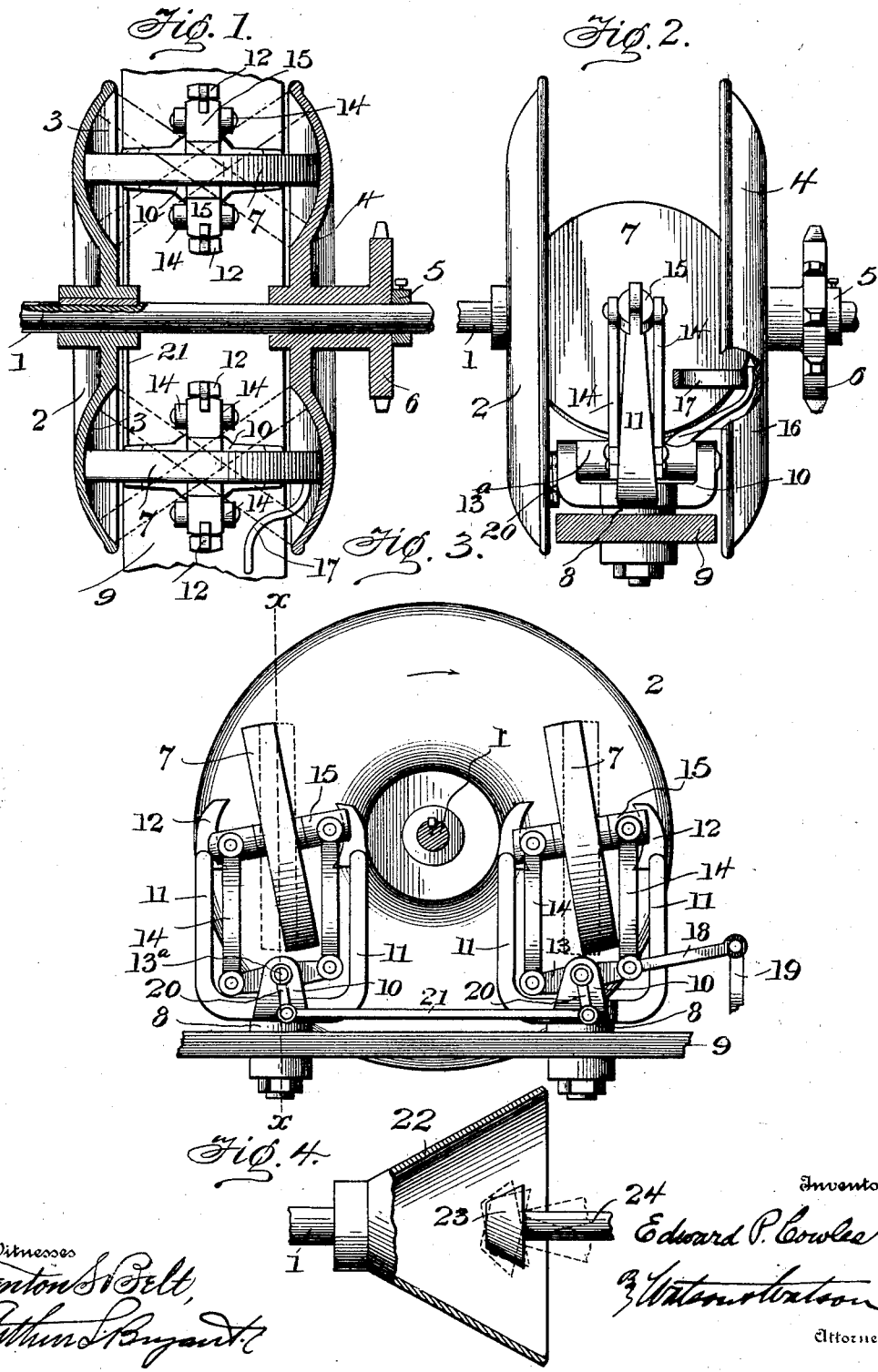

EDWARD P. COWLES, OF WARREN, OHIO.

VARIABLE-SPEED FRICTION-GEARING.

SPECIFICATION forming part of Letters Patent No. 703,237, dated June 24, 1902.

Application filed December 7, 1900. Serial No. 39,065. (No model.)

*To all whom it may concern:*

Be it known that I, EDWARD P. COWLES, a citizen of the United States, residing at Warren, in the county of Trumbull, State of Ohio, have invented certain new and useful Improvements in Variable-Speed Friction-Gearing, of which the following is a specification.

This invention relates to improvements in variable-speed friction-gearing; and the object of the invention is to provide a mechanism in which the adjustment of the friction power-transmitter relative to the driving or driven elements to vary the speed of the latter will be effected practically automatically.

In the accompanying drawings, Figure 1 is a plan view, partly in section, of a friction-gear mechanism embodying my improvements. Fig. 2 is an end elevation of the same. Fig. 3 is a side elevation, the driven disk being removed; and Fig. 4 illustrates the application of my invention to a somewhat different form of gearing from that shown in Figs. 1 to 3.

Referring to the drawings, 1 designates a power-shaft adapted to be geared or connected to any suitable motor or engine. (Not shown.) On said shaft is splined or otherwise secured to rotate therewith a driving element 2, which in the embodiment of the invention illustrated in Figs. 1 to 3 is made in the form of a circular disk having an annular groove 3, concave in cross-section, formed in one face. A driven element 4 is suitably mounted to rotate about the same axis as the driving-disk. The driven disk 4 is shown in Figs. 1 to 3 of the same form as the driving-disk and is loosely mounted upon the shaft 1, being held against movement longitudinally of the shaft away from the driving-disk by a suitable collar 5. The driven disk 4 is provided on its outer face or side with a suitable sprocket 6, from which the power communicated to said disk can be transmitted to any desired place or machine.

Between the disks 2 4 are mounted any suitable number of friction power-transmitting rollers 7, which are of the same diameter as a cross-section of the space bounded by the concave faces of the annular grooves 3 in said disks. Preferably I employ two of said friction wheels or rollers, arranging them on opposite sides of the shaft 1, each being so supported that it is adapted to be adjusted from the position indicated in full lines in Fig. 1 to those indicated in dotted lines in the same figure, whereby the speed of the driven disk 4 can be varied without affecting the rotation of the shaft 1 and disk 2, fast thereon. When the friction-rollers 7 are in normal position, their planes of rotation are tangent to a circle at right angles to and concentric with the shaft 1 at their points of contact. When the rollers 7 are in such position that their points of contact with both disks 2 4 are equidistant from the shaft 1, both disks will rotate with the same speed; but, as is apparent, the relation of the speed of the driven disk to that of the driving-disk may be varied by adjusting the friction-rollers from a position of parallelism with the shaft 1 to a position at an angle thereto. With devices heretofore proposed for adjusting the friction-rollers relative to the disks 2 4 the roller always occupied a position in which its plane of rotation was tangent to a circle having its center in the axis of the shaft 1, and such adjustment necessarily required the expenditure of considerable power to overcome the friction between the roller and the disks. To effect such movement of the friction-rollers automatically and with a minimum exertion of power on the part of the operator, I mount them so that they can be adjusted from their normal tangent position, above described, into a position in which their planes of rotation will not be tangent to a circle described about the shaft 1 through the points of contact, whereby the engagement of the disks 2 4 with them will cause the said rollers to move in a spiral path toward or from the axis of the disks. Each friction-roller is mounted on a spindle 8, which is suitably journaled in a plate or support 9 and projects inwardly between the disks 2 4. At its inner end the spindle 8 is provided with two yokes 10 11, which extend at right angles to each other, the arms of the yoke 11 being of greater length than those of the yoke 10 and terminating in guides 12, extending across a plane including the axis of shaft 1. In the arms of the shorter yoke 10 is journaled a rock-shaft 13ª, which is provided with two diametrically-opposite laterally-projecting arms 13. The free ends of these arms are pivotally connected to one end of links 14, the other ends of which are pivotally connected to blocks 15, adapted to engage the guides 12, carried by the aforesaid yoke 11, and also serving as bearings for the shaft of the friction-roller 7. It will thus be seen that the friction-roller is mounted upon a spindle adapted to turn about an axis indicated by the dotted line $x\ x$ in Fig. 3 and that said roller can also be rocked about an axis parallel to the axis of the shaft 13$^a$, carrying arms 13, whereby the plane of rotation of the roller will be shifted to or from a plane tangent to a circle drawn about the shaft 1, with a radius extending to the point of contact of the roller with the disk. When adjusted into such a position, as is indicated by full lines in Fig. 3, (the normal position of the roller 7 being indicated in dotted lines in this figure,) it will be seen that the roller will be caused to travel in a spiral path across the face of the disk 2 toward the axis of said disk and into the proper position to drive the disk 4 at the desired speed, the spindle 8 being simultaneously rotated about its axis. By rocking the friction-roller 7 into a plane on the opposite side of its normal position from that shown in full lines in Fig. 3 the said roller 7 will be caused to travel over the surface of the disk 2, away from the shaft 1. It will be understood that a very slight movement of the shaft 13$^a$ is sufficient to bring the roller 7 carried thereby into a position to cause it to travel in a spiral path relative to disk 2. In Fig. 3 of the drawings I have for the sake of clearness greatly exaggerated the extent of such rocking movement. As soon as the roller 7 has been properly adjusted relative to the disks 2 4 and the power employed to rock the shaft 13$^a$ discontinued the said roller automatically returns to a position in which its plane of rotation is tangent to circles having the axis of shaft 1 passing through their center.

In order that all of the friction-rollers 7 may be simultaneously adjusted, the different rock-shafts are suitably connected. Each of said shafts may, as shown in Fig. 3, have a link 20 connected thereto, the said links being connected together by a rod 21. Any suitable means may be employed to rock said shafts and properly adjust the pivoted parallelograms supporting the friction-rollers. In Figs. 1 and 2 of the drawings I have shown an arm 16 extending from one of the said shafts to a handle or lever 17, that extends out beyond the peripheries of the disks 2 4, and in Fig. 3 I have shown a slightly-different construction. In the construction shown in Fig. 3 an arm 18 is rigidly connected to and forms a continuation of one of the arms 13, and an operating-piece 19 is connected to said arm 18.

In Fig. 4 I have illustrated the application of my invention to a friction driving-gear in which one element, 22, is in the form of a hollow cone, the other element being a friction-roller 23, mounted on the end of a shaft 24. By adjusting the roller relative to its normal axis of rotation into the positions indicated in dotted lines in said figure the said roller will automatically move bodily lengthwise of the cone 22, and the speed of the driven element will be correspondingly changed.

Having thus described my invention, what I claim as new, and desire to secure by Letters Patent, is—

1. In a device for changing speed, two parallel, rotatable wheels or disks, a friction-roller supported between and arranged to engage both said disks to transmit motion from one to the other, and means for adjusting the plane of rotation of said friction-roller angularly to its normal tangent position at its point of contact to cause said roller to traverse said wheels or disks in opposite directions toward or from their centers.

2. In a device for changing speed, a rotatable wheel or disk, a friction-roller arranged to engage said wheel or disk, a shaft supporting said friction-roller, links pivotally connected to the ends of said shaft, a spindle rotatable about an axis lying in the normal plane of rotation of the roller, arms pivotally connected to said spindle and to the aforesaid links, means for rocking said arms about their pivotal connection with the spindle to adjust the plane of rotation of the friction-roller angularly to its normal tangent position at its point of contact, whereby the spindle will be rotated and the friction-roller will traverse the wheel or disk either from or toward its center, and means for applying power to or taking power from said friction-roller.

3. In a device for changing speed, a rotatable wheel or disk, a friction-roller arranged to engage said wheel or disk and to be adjusted bodily about two axes at right angles to each other, means for positively adjusting said roller about one of said axes from its normal tangent position at its point of contact, and a support for said roller so constructed that when the plane of rotation of said roller is varied as aforesaid said support and the roller will be automatically adjusted about the other said axis and caused to traverse the wheel or disk either from or toward its center.

4. In a device for changing speed, a rotatable wheel or disk, a friction-roller arranged to engage the said wheel or disk and normally rotating in a plane tangent to a circle described about the axis of said wheel or disk, a movable carrier for said roller, means for adjusting the said roller from said normal tangent position, whereby the carrier for the roller will be automatically moved and the roller will traverse the wheel or disk from or toward its center, and a pivotal support for the roller on said carrier adapted after each such adjustment to return the roller to its normal tangent position.

5. In a device for changing speed, two, parallel, rotatable wheels or disks, a friction-roller arranged between and engaging with both said wheels or disks, a rotatable spindle extending between said wheels or disks and having at its end between said wheels or disks two yokes, a rock-shaft journaled in the arms of one of said yokes and provided with two diametrically opposite arms, a shaft for the friction-roller extending parallel to said arms on the rock-shaft, the bearings for said shaft engaging the arms on the other yoke, and links pivotally connected to the arms on the rock-shaft and to said bearings, and means for rocking said rock-shaft.

In testimony whereof I affix my signature in presence of two witnesses.

EDWARD P. COWLES.

Witnesses:
C. D. WILLIAMSON,
W. B. AWAGER.